(12) United States Patent
Van Vlassenrode et al.

(10) Patent No.: US 11,959,286 B2
(45) Date of Patent: Apr. 16, 2024

(54) METHOD FOR MANUFACTURING A FLOOR OR WALL PANEL

(71) Applicant: FLOORING INDUSTRIES LIMITED, SARL, Bertrange (LU)

(72) Inventors: Kristof Van Vlassenrode, Deinze (BE); Jochen Bossuyt, Tiegem (BE)

(73) Assignee: UNILIN BV, Wielsbeke (BE)

( * ) Notice: Subject to any disclaimer, the term of this patent is extended or adjusted under 35 U.S.C. 154(b) by 192 days.

(21) Appl. No.: 17/421,233

(22) PCT Filed: Jan. 7, 2020

(86) PCT No.: PCT/IB2020/050072
§ 371 (c)(1),
(2) Date: Jul. 7, 2021

(87) PCT Pub. No.: WO2020/144559
PCT Pub. Date: Jul. 16, 2020

(65) Prior Publication Data
US 2022/0120095 A1 Apr. 21, 2022

(30) Foreign Application Priority Data
Jan. 9, 2019 (BE) .................................. 2019/5010

(51) Int. Cl.
| | | |
|---|---|---|
| *B27N 3/24* | (2006.01) | |
| *B27N 7/00* | (2006.01) | |
| *B29C 43/30* | (2006.01) | |
| *B29C 43/46* | (2006.01) | |
| *B29C 43/48* | (2006.01) | |

(Continued)

(52) U.S. Cl.
CPC .............. *E04F 15/105* (2013.01); *B27N 3/24* (2013.01); *B27N 7/005* (2013.01); *B29C 43/305* (2013.01);

(Continued)

(58) Field of Classification Search
CPC .......... B27N 7/005; B27N 3/24; B29C 43/48; B29C 44/304; B29C 2043/467;
(Continued)

(56) References Cited

U.S. PATENT DOCUMENTS 4,790,257 A * 12/1988 Schermutzki ......... B29C 70/504
156/181
10,059,072 B2 8/2018 Hannig
(Continued)

FOREIGN PATENT DOCUMENTS

| | | |
|---|---|---|
| BE | 1023446 B1 | 3/2017 |
| BE | 1024909 B1 | 8/2018 |

(Continued)

OTHER PUBLICATIONS

Search Report and Written Opinion from corresponding Belgian Application No. BE201905010, dated Sep. 25, 2019.
(Continued)

*Primary Examiner* — Francisco W Tschen
*Assistant Examiner* — Elisa H Vera
(74) *Attorney, Agent, or Firm* — Workman Nydegger

(57) ABSTRACT

A method for making a floor or wall panel has a foamed polymer core. A foamable polymer powder is foamed between two conveyor belts in the forming zone of a steel belt press. The sum of the thicknesses of the two conveyor belts and the total thickness of the layers at the entrance of the steel belt press is less than or equal to the opening of the steel belt press at the entrance of the steel belt press. The sum of the thicknesses of the two conveyor belts and the total thickness of the substrate at the outlet of the steel belt press is equal to the opening of the steel belt press at the outlet of the steel belt press and greater than the sum of the thicknesses of the two conveyor belts and the total thickness of the layers at the entrance of the steel belt press.

20 Claims, 3 Drawing Sheets

(51) Int. Cl.
    *B29C 44/20*     (2006.01)
    *B29C 44/30*     (2006.01)
    *B29C 44/34*     (2006.01)
    *B29K 27/06*     (2006.01)
    *B29L 7/00*     (2006.01)
    *B29L 31/00*     (2006.01)
    *E04F 13/18*     (2006.01)
    *E04F 15/10*     (2006.01)

(52) U.S. Cl.
    CPC .............. *B29C 43/46* (2013.01); *B29C 43/48* (2013.01); *B29C 44/206* (2013.01); *B29C 44/304* (2013.01); *B29C 44/3415* (2013.01); *E04F 13/18* (2013.01); *B29C 2043/467* (2013.01); *B29C 2043/483* (2013.01); *B29K 2027/06* (2013.01); *B29L 2007/002* (2013.01); *B29L 2031/732* (2013.01)

(58) Field of Classification Search
    CPC . B29C 2043/483; B29C 44/206; B29C 44/30; B29L 2007/002; B29L 2031/732; B32B 5/18; B32B 5/20; B32B 5/32; B29K 2027/06
    See application file for complete search history.

(56) References Cited

U.S. PATENT DOCUMENTS

| | | | |
|---|---|---|---|
| 10,961,721 B2 | 3/2021 | Van Vlassenrode et al. | |
| 2002/0136862 A1* | 9/2002 | Dong | B32B 21/08 428/479.6 |
| 2016/0136913 A1 | 5/2016 | Hannig | |
| 2019/0153734 A1 | 5/2019 | Van Vlassenrode et al. | |
| 2020/0016799 A1 | 1/2020 | Van Vlassenrode et al. | |

FOREIGN PATENT DOCUMENTS

| | | | |
|---|---|---|---|
| CA | 2183261 A1 | 6/1996 | |
| CA | 2538459 A1 * | 9/2006 | ............. B29C 44/30 |
| EP | 3024669 A1 | 6/2016 | |
| JP | S6092809 A | 5/1985 | |
| WO | 2017046693 A1 | 3/2017 | |

OTHER PUBLICATIONS

International Search Report and Written Opinion from PCT Application No. PCT/IB2020/050072, dated Apr. 28, 2020.

* cited by examiner

METHOD FOR MANUFACTURING A FLOOR OR WALL PANEL

TECHNICAL FIELD

The invention relates to methods for making floor or wall panels, more specifically to the manufacture of floor or wall panels with a foamed core.

PRIOR ART

Manufacture of wall or floor panels with double belt presses is known from EP3024669A1. In the methods described therein, the manufacture of panels with foamed cores has the disadvantage that the product is subjected to a pressing action after foaming. This action may adversely affect the characteristics of the foam formed. The forces exerted may possibly put the walls between different cells in the foam under pressure or even cause them to rupture, which may negatively affect the strength of the foam.

SUMMARY OF THE INVENTION

It is an aim of the invention to provide a method in which the foamed core obtained is more even and uniform, and wherein the foam formed is no longer subjected to high pressures.

According to a first aspect, a method is provided for making a floor or wall panel comprising a foamed polymer core, wherein one or more layers of polymer powder comprising at least one foamable polymer powder are foamed at least partially onto a substrate between two conveyor belts of a double belt press in the forming zone of a steel belt press, the sum of the thicknesses of the two conveyor belts and the total thickness of the layers at the entrance of the steel belt press is less than or equal to the opening of the steel belt press at the entrance of the steel belt press, and wherein the sum of the thicknesses of the two conveyor belts and the total thickness of the substrate formed at the outlet of the steel belt press
- is equal to the opening of the steel belt press at the outlet of the steel belt press and
- is greater than the sum of the thicknesses of the two conveyor belts and the total thickness of the layers at the entrance of the steel belt press.

According to some embodiments, a method is provided for making a floor or wall panel comprising a foamed polymer core, wherein one or more layers of polymer powder comprising at least one foamable polymer powder are foamed at least partially onto a substrate between two conveyor belts of a double belt press in the forming zone of a steel belt press, the sum of the thicknesses of the two conveyor belts and the total thickness of the layers at the entrance of the steel belt press is smaller than the opening of the steel belt press at the entrance of the steel belt press.

According to some embodiments, a method is provided for making a floor or wall panel comprising a foamed polymer core, wherein one or more layers of polymer powder comprising at least one foamable polymer powder are foamed at least partially onto a substrate between two conveyor belts of a double belt press in the forming zone of a steel belt press, the sum of the thicknesses of the two conveyor belts and the total thickness of the layers at the entrance of the steel belt press is smaller than the opening of the steel belt press at the entrance of the steel belt press and wherein the sum of the thicknesses of the two conveyor belts and the total thickness of the substrate formed at the outlet of the steel belt press
- is equal to the opening of the steel belt press at the outlet of the steel belt press and
- is greater than the sum of the thicknesses of the two conveyor belts and the total thickness of the layers at the entrance of the steel belt press.

According to some embodiments, the sum of the thicknesses of the two conveyor belts and the total thickness of the substrate formed at the outlet of the steel belt press may be between 1.02 and 1.5 times the sum of the thicknesses of the two conveyor belts and the total thickness of the layers at the entrance of the steel belt press. According to some embodiments, the sum of the thicknesses of the two conveyor belts and the total thickness of the substrate formed at the outlet of the steel belt press may be between 1.05 and 1.25 times the sum of the thicknesses of the two conveyor belts and the total thickness of the layers at the entrance of the steel belt press.

According to some embodiments, the method comprises the steps of
a) providing a double belt press comprising two conveyor belts that define a product gap and a forming zone for forming a polymer substrate from a polymer powder, said forming zone comprising a steel belt press that defines an opening in which the product gap is located;
b) providing one or more layers of thermoplastic polymer powder, said layers comprising at least one layer of foamable polymer powder;
c) transforming the one or more layers of polymer powder in the forming zone into a polymer substrate comprising a foamed layer of polymer;

wherein the foamable polymer powder foams at least partially in the forming zone, the sum of the thicknesses of the two conveyor belts and the total thickness of the layers at the entrance of the steel belt press is less than or equal to the opening of the steel belt press at the entrance of the steel belt press, and wherein the sum (T4) of the thicknesses of the two conveyor belts and the total thickness of the substrate at the outlet of the steel belt press
- is equal to the opening of the steel belt press at the outlet of the steel belt press and
- is greater than the sum of the thicknesses of the two conveyor belts and the total thickness of the layers at the entrance of the steel belt press.

According to some embodiments, the method for making a floor or wall panel comprising a foamed polymer core comprises the steps of
a) providing a double belt press comprising two conveyor belts between which a product gap is defined, said double belt press comprising the following successive zones:
   i) a spreading zone for spreading polymer powder on the lower of the two conveyor belts;
   ii) a heating zone for heating the polymer powder;
   iii) a forming zone for forming a polymer substrate from the polymer powder, said forming zone comprising a steel belt press that defines an opening between which the two conveyor belts run, with the product gap between them;
   iv) a cooling zone for cooling the substrate formed;
b) providing one or more layers of thermoplastic polymer powder on the lower conveyor belt in the spreading zone, said layers comprising at least one layer of foamable polymer powder;
c) heating the layers in the heating zone;

d) transforming the one or more layers of polymer powder in the forming zone into a polymer substrate comprising a foamed layer of polymer;

e) cooling the foamed polymer substrate in the cooling zone; wherein the foamable polymer powder foams at least partially in the forming zone, the sum of the thicknesses of the two conveyor belts and the total thickness of the layers at the entrance of the steel belt press is less than or equal to the opening of the steel belt press at the entrance of the steel belt press, and wherein the sum (T4) of the thicknesses of the two conveyor belts and the total thickness of the substrate at the outlet of the steel belt press is equal to the opening of the steel belt press at the outlet of the steel belt press and is greater than the sum of the thicknesses of the two conveyor belts and the total thickness of the layers at the entrance of the steel belt press.

The double belt press comprises two endless conveyor belts, typically two reinforced (e.g. glass fiber-reinforced) polymer belts, which are optionally coated with a nonstick layer, for example Teflon, on the side oriented toward the product gap. The product in the product gap is moved by the motion of the conveyor belts from front to back through the machine. Both conveyor belts comprise, on the front and rear of the machine, reversing rollers and a drive mechanism in order to move each of the belts back from the rear to the front. The product in the product gap and the conveyor belts preferably move synchronously.

The total thickness of the layers at the entrance of the product gap is typically greater than the opening of the product gap. The action of these conveyor belts will then also be a compressing action on the pulverulent polymer layers. It densities the packing of the powders, by a factor of 2 or even higher. The lower conveyor belt typically extends beyond the upper conveyor belt, so that a kind of table is generated, on which the powders can be spread by spreading units. Optionally, here there are detecting mechanisms which measure the thickness of the spread layers and optionally control the spreading units to spread more or less.

In the heating zone, heat is transferred from a heat source on the upper and lower side of the product gap, to the material in the product gap, through the conveyor belts. These heat sources are often metal plates or containers provided with a heating fluid. Successive plates or containers may have a different temperature, so that through the heating zone, in the direction of passage of the product, i.e. the production direction, a temperature gradient can be established, usually a rising temperature in the direction of passage.

In the cooling zone, heat is extracted by cooling sources on the upper and lower side of the product gap, from the material in the product gap, through the conveyor belts. These cooling sources are often metal plates or containers provided with a coolant. Successive plates or containers may have a different temperature, so that through the heating zone, in the direction of passage of the product, i.e. the production direction, a temperature gradient can be established, usually a decreasing temperature in the direction of passage.

The steel belt press is a press comprising an upper and a lower steel belt, between which an opening is defined, and a material can be pressed in said opening.

Owing to the heating in the heating zone, and possibly in the forming zone, the powder will melt and the powder is converted to a substrate, in sheet form. In view of this setting, at a sufficiently high temperature the foamable polymer powder can foam before or in the steel belt press. The press opening is defined so that at the entrance of the steel belt press, the upper conveyor belt does not yet reach the uppermost of the two steel belts, whereas somewhere along the steel belt press in the production direction, the upper conveyor belt will reach the uppermost of the two steel belts because of the foaming of the foamable polymer powder.

According to some embodiments, the opening of the steel belt press at the entrance of the steel belt press may be identical to the opening of the steel belt press at the outlet of the steel belt press.

According to some embodiments, the forming zone may comprise a pair of press rolls and/or an S-bend roll, which are positioned before the steel belt press.

According to some embodiments, the steel belt press may be an isochoric steel belt press. According to some embodiments, the steel belt press may be an isobaric steel belt press.

According to some embodiments, the layers may comprise at least one and optionally several layers of foamable PVC powder.

According to some embodiments, the one or more layers of polymer powder may be one or more layers of PVC powder. Thermoplastic polymers are preferably polyvinyl chloride (PVC), but may also be polyethylene (PE), polypropylene (PP), polyurethane (PU) or polyester (PES), for example polyethylene terephthalate (PET). The polymer powders, for example the PVC powders, optionally the foamable polymer powder, for example PVC powder, may be provided as a dry blend, as described in BE1023446B1. The polymers used preferably have a K value (Fikentscher) of less than or equal to 85, for example less than or equal to 60, for example less than 58, for example such as a K value of 57. Said polymers may be PVC. Said products may also be copolymers of vinyl chloride (VC) and vinyl acetate (VA), for example copolymers with a VC/VA ratio from 70/30 to 50/50.

The polymers used, for example PVC, preferably comprise plasticizers, preferably in an amount of less than 20 phr (parts by weight per hundred parts by weight of polymer), for example in an amount from 5 to 15 phr.

The plasticizers may be, among other things, esters of carboxylic acids (for example esters of orthophthalic or terephthalic acid, trimellitic acid, benzoic acid and adipic acid), for example diisononyl phthalate (DINP), dioctyl terephthalate (DOTP), diisononyl-1,2-cyclohexanedicarboxylate (DINCH), esters of phosphoric acid, for example triaryl or trialkaryl phosphates, for example tricresyl phosphate, chlorinated or unchlorinated hydrocarbons, ethers, polyesters, polyglycols, sulfonamides, or combinations thereof.

The powder may be provided as a dry blend, which is a mixture of powder fractions of each of the ingredients. The dry-blend powders may, besides polymer (whether or not with plasticizer incorporated in the polymer), further comprise fillers, such as calcium carbonate, e.g. chalk or limestone, or also expandable fillers such as Expancel. Other usual fillers are glass fibers, calcium hydroxide (slaked lime), and calcium hydrogen carbonate, and/or $CaMg(CO_3)_2$, talc, or also other lightweight fillers such as hollow microspheres. The fillers may provide between 20 and 70 wt % of the complete powder, for example between 30 and 60 wt %, expressed relative to the total weight of the powder. This powder may further comprise additives such as pigments and dyes, preservatives, antifungals, thermal stabilizers, UV-stabilizers, blowing agents, viscosity controllers, and the like.

The dry-blend powders may also comprise pulverulent chemical foaming agents or blowing agents, such as azodicarbonamide (ADCA) or azoisobutyronitrile (AIBN).

The polymer powder may be micronized powder, as described in BE1024909B1. The powder granules may, besides the polymer such as described above, comprise the fillers and the plasticizers. The powder granules may have a median D50 situated between 100 μm and 750 μm, for example a median between 250 μm and 350 μm, for example about 300 μm. Preferably the ratio of median to tenth percentile D10 satisfies the condition (D50-D10)/D50>0.5, preferably >0.75. In the case of micronized powder, virtually every powder granule also comprises, besides polymer and optionally plasticizer, fillers as stated above. The micronized powder further comprises pulverulent chemical foaming agents or blowing agents as stated above.

According to other embodiments, the polymer powder consists of granules or flakes, said granules themselves consisting of polymer material. Typical, but not to be understood as limiting, dimensions of such granules are cylindrical granules with a diameter between 1 and 3.5 mm and a length of between 0.5 and 1 mm.

According to some embodiments, after the cooling zone, a decorative layer and/or a wearing layer may be applied on the formed substrate. The decorative layer is preferably a printed polymer film, e.g. a PVC film, which is applied. The wearing layer or wear-resistant layer is preferably a translucent or transparent polymer layer, for example a PVC layer. The decorative layer may for example reproduce a wooden structure. The wearing layer may comprise wear-resistant particles, such as aluminum oxide.

According to some embodiments, a coating may be applied on the wearing layer. The coating may for example be a UV-curing PU layer. After application of the wearing layer and before application of the coating, indenting or "embossing" may take place. Examples of usable varnish layers are varnish layers based on urethane acrylates, polyester acrylates and/or epoxide acrylates. The varnish layer may be a varnish layer that is cured by means of UV radiation or excimer radiation. The varnish layer too may comprise wear-resistant particles.

According to some embodiments, the decorative layer and/or the wearing layer may be applied by thermal laminating.

The surfaces thus obtained may be cut or sawn into panels. Optionally they may be provided with coupling means on one or both pairs of sides, and said coupling means may interact with the coupling means of identical panels.

According to some embodiments, the foamable or foaming layer of polymer powder may be foamed chemically.

According to some embodiments, the foamable or foaming layer of polymer powder may be foamed by expansion of one or more fillers.

According to some embodiments, the foaming of the at least one layer of foamable polymer powder may start in the heating zone. The polymer powder is preferably heated in the heating zone to a temperature beyond the glass transition temperature (Tg), preferably to a temperature between Tg and the melting point (Tm). The decomposition temperature of optionally used chemical blowing agents, such as ADCA, is preferably also between Tg and Tm, so that the blowing agent becomes active in or shortly after the heating zone.

According to some embodiments, the foaming of the at least one layer of foamable polymer powder may start or continue in the forming zone. According to embodiments, the foaming may already start in the heating zone.

According to some embodiments, during transforming, the steel belt press may be used in order to heat the layers of polymer. According to some embodiments, during transforming, the steel belt press may be used in order to cool the layers of polymer.

According to some embodiments, more than one layer of polymer powder may be spread in step b). According to some embodiments, the layer of foamable polymer powder may be the first layer of polymer powder that is spread on the lower conveyor belt in step b). According to some embodiments, the layer of foamable polymer powder may be the second or further layer of polymer powder that is spread on the lower conveyor belt in step b). According to some embodiments, the layer of foamable polymer powder may be the last layer of polymer powder that is spread on the lower conveyor belt in step b).

According to some embodiments, during step b), at least one textile product may be placed between two successive layers of polymer powder.

According to some embodiments, at least two layers of foamable polymer powder may be spread successively in step b). According to some embodiments, in step b), one textile product may be placed between said two layers of foamable polymer powder. According to some embodiments, in step b) several textile products may be placed between mutually different pairs of layers of polymer powder.

The textile products are preferably nonwoven or woven products, preferably nonwovens, such as needle-felt or spunbonded nonwoven.

These textile products are preferably a textile reinforcing layer comprising glass fiber such as a glass-fiber web or a glass-fiber fabric. Preferably a glass-fiber web is used, which may preferably have a weight per unit area between 30 and 60 g/m$^2$ and a thickness of between 0.20 and 0.45 mm, for example between 0.25 and 0.45 mm. The textile products used may be mutually identical or different.

Textile products preferably used are glass-fiber web, which may preferably have a weight per unit area between 30 and 60 g/m$^2$ and a thickness of between 0.20 and 0.45 mm, for example between 0.25 and 0.45 mm.

The method has the advantage that the foaming of the polymer, for example PVC, takes place controlled within a well-determined space defined by the distance between the steel belts of the steel belt press. In this way, a surface may arise with evenly distributed foamed product and a uniform total thickness, where no further mechanical action is required in order to provide this more uniform thickness.

The independent and dependent claims present specific and preferred features of the embodiments of the invention. Features of the dependent claims may be combined with features of the independent and dependent claims, or with features described above and/or hereunder, and in any suitable manner as would be obvious to a person skilled in the art.

The aforementioned and other features, properties and advantages of the present invention will be explained by means of the following examples of embodiments, optionally in combination with the drawings.

The description of these examples of embodiments is given as explanation, without the intention of limiting the scope of the invention. The reference numbers in the description following hereunder refer to the drawings. The same reference numbers in optionally different figures refer to identical or similar elements.

BRIEF DESCRIPTION OF THE FIGURES

For better illustration of the features of the invention, some preferred embodiments are described hereunder, as examples without any limiting character, with reference to the appended drawings, in which.

DESCRIPTION OF EXAMPLES OF EMBODIMENTS

The present invention is described hereunder making use of specific embodiments.

It should be pointed out that the term "comprising", for example as used in the claims, should not be interpreted in a limiting sense, limiting to the elements, features and/or steps following thereafter. The term "comprising" does not exclude the presence of other elements, features or steps.

Thus, the scope of an expression "an object comprising the elements A and B" is not limited to an object that only contains the elements A and B. The scope of an expression "a method comprising the steps A and B" is not limited to a method that only contains the steps A and B.

In the light of the present invention, these expressions only signify that the relevant elements or steps for the invention are the elements or steps A and B.

In the specification following hereunder, reference is made to "an embodiment" or "the embodiment". Such reference signifies that a specific element or feature, described on the basis of this embodiment, is comprised in at least this one embodiment.

The presence of the terms "in an embodiment" or "in the embodiment" at various places in this description refers, however, not necessarily to the same embodiment, although it might well refer to one and the same embodiment.

Moreover, the properties or the features may be combined in any suitable manner in one or more embodiments, as would be obvious to a person skilled in the art.

Figure 1:
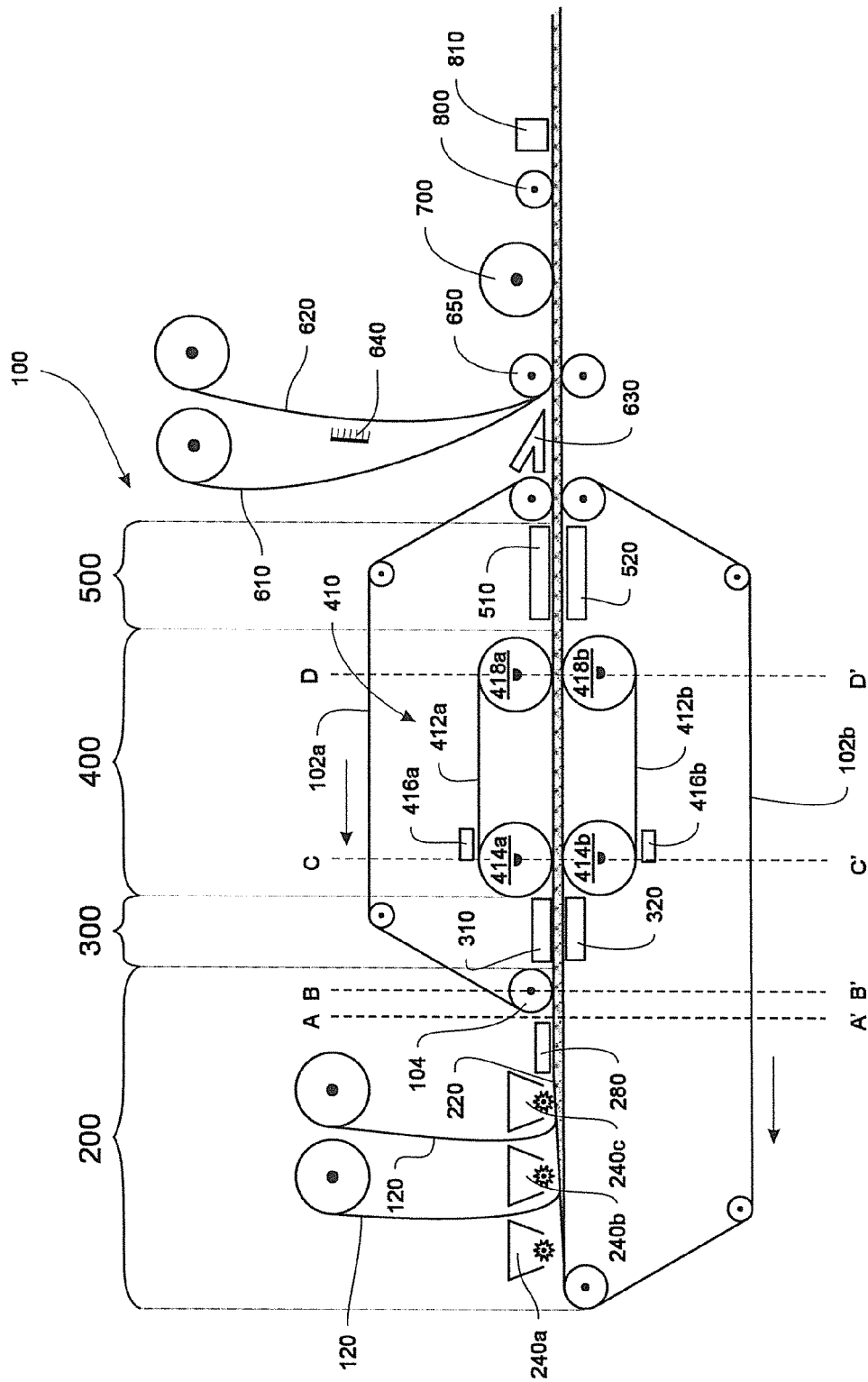
FIG. 1 is a schematic representation of a production process according to the invention.

A double belt press for the manufacture of a wall or floor panel according to the methods of the invention is shown in FIG. 1. The double belt press 100 comprises two conveyor belts 102a and 102b between which a product gap is defined. The double belt press 100 comprises the following successive zones:

- a spreading zone 200 for the spreading of polymer powder 220 on the lower of the two conveyor belts 102b;
- a heating zone 300 for heating the polymer powder by means of heat sources 310 and 320, on both sides of the conveyor belts. Here, these heat sources are containers filled with heating fluid, which have one side that is pressed against the respective conveyor belt;
- a forming zone 400 for forming a polymer substrate from the polymer powder, said forming zone comprising a steel belt press 410 that defines an opening between which the two conveyor belts run, with the product gap between them;
- a cooling zone 500 for cooling the formed substrate by means of cooling elements or cooling sources 510 and 520, on both sides of the conveyor belts. Here, these cooling sources are containers filled with coolant, which have one side that is pressed against the respective conveyor belt.

In this embodiment, the spreading zone comprises three spreading units 240a, 240b and 240c, each for spreading out a layer of micronized PVC powder. A glass-fiber web 120 is applied between each of the layers. This web has a weight per unit area from 30 to 50 g/m²

The powder that is spread in the first and third unit 240a and 240c is a PVC powder, with as components, besides PVC with K value K50, K57, K60, and optionally being a VC/VA copolymer, stabilizers and additives between 5 and 20 phr, filler, preferably calcium carbonate, between 50 and 300 phr and plasticizers between 0 and 20 phr. "phr" signifies the number of parts by weight of the product per hundred parts by weight of PVC. This PVC is not foamable.

The powder that is spread in the second unit 240b is foamable PVC powder with composition is a foamable PVC powder, with as components, besides PVC with K value K50, K57, K60, and optionally being a VC/VA copolymer, and ADCA as foam-forming additive or blowing agent, stabilizers and other additives between 5 and 20 phr, filler, preferably calcium carbonate, between 50 and 300 phr and plasticizers between 0 and 20 phr.

The layers of powder may, but need not in a first instance be preheated with IR radiators 280. The lower conveyor belt brings the layered structure with a thickness T1 to the opening of the product gap between the two conveyor belts. This opening has an opening size T2 of about half the thickness T1. The layers of powder are thus densified (and air is expelled from between the granules) by passing the layered structure between the transport rolls. The layered structure of layers of powder is squeezed between the conveyor belts and led through the heating zone 300. The PVC materials and the glass-fiber webs are heated to a temperature between 180 and 240° C. Preferably the activation temperature of the blowing agent is about 20° C. lower than the melting point of the polymer, in this case PVC. The temperature is gradually increased in the direction of passage of the conveyor belt. At the end of the heating zone, the blowing agent will begin to swell and gasify, so that the middle layer of PVC begins to foam.

The swelled product then comes between the steel belts 412a and 412b of the steel belt press 410, an opening being defined between said belts, between which the two conveyor belts pass, with the layered structure in the product gap between them. The two reversing rollers 414a and 414b are configured so that the opening between the steel belts T3 is greater than the thickness of the layered, foaming structure that passes between the rolls and the thickness of the two conveyor belts 102a and 102b. Since foaming still continues, over a short distance in the gap, the layered structure, carried by the lower steel belt 412b, will begin to press against the top steel belt 412a. The steel belt press, which is preferably of isochoric configuration, will generate a back pressure and thus provide the correct thickness of the substrate, which is formed meanwhile. During passage through the opening of this steel belt press, the forming substrate will be cooled considerably, gradually stopping the foaming. For this purpose, the steel belts are cooled by cooling units 416a and 416b. At the level of the reversing rollers 418a and 418b, the substrate will be cool enough so that it no longer changes shape, and the thickness T4 of the substrate and the conveyor belts will be as thick as the opening between the reversing rollers 418a and 418b.

The thickness of the substrate and the conveyor belts at the level of the reversing rollers, i.e. at the outlet of the steel belt press, is preferably between 1.02 and 1.5 times the thickness of the layered, foaming structure and the thickness of the two conveyor belts at the entrance of the steel belt press, preferably between 1.05 and 1.25 times this thickness.

The layered structure of layers of powder is squeezed between the conveyor belts and led through the cooling zone 500. The PVC materials and the glass-fiber webs are cooled to a temperature that makes the substrate suitable for the next production step. The temperature is roughly 100° C.

In a subsequent laminating step 600, a decorative PVC film 610 (which is printed with a decorative pattern) and a transparent PVC wearing layer 620 are first warmed on their underside by IR radiators 630 and 640, and then pressed against the upper surface of the substrate with nip rollers 650.

The PVC decorative film 610 is a printed PVC film with a thickness of between 75 and 120 μm.

The wearing layer 620 is a transparent PVC film with a thickness of about 150 to 700 μm.

After the wearing layer, stamping is then carried out with embossing roll 700, after which a PU varnish layer, which is UV-cured, is applied with roll 800 and UV radiator 810.

The product thus obtained can be cut into rigid PVC planks and each plank may be provided with coupling means on two or four of its sides. The cross section of said plank has a layered structure with, from top to bottom, a wearing layer, a decorative layer, a first rigid, unfoamed layer of PVC with density between 1.7 and 2.1 g/cm$^3$, a first glass-fiber reinforcement, a foamed PVC layer with density in unfoamed form between 1.7 and 2.1 g/cm$^3$ and a foaming factor from 10 to 100%, a second glass-fiber reinforcement, and a PVC backing layer with density between 1.7 and 2.1 g/cm$^3$.

A foaming factor from 10 to 100% signifies that the unfoamed density A is reduced by a factor of 1.1 to 2 (being between A/1.1 and A/2).

Figure 2:
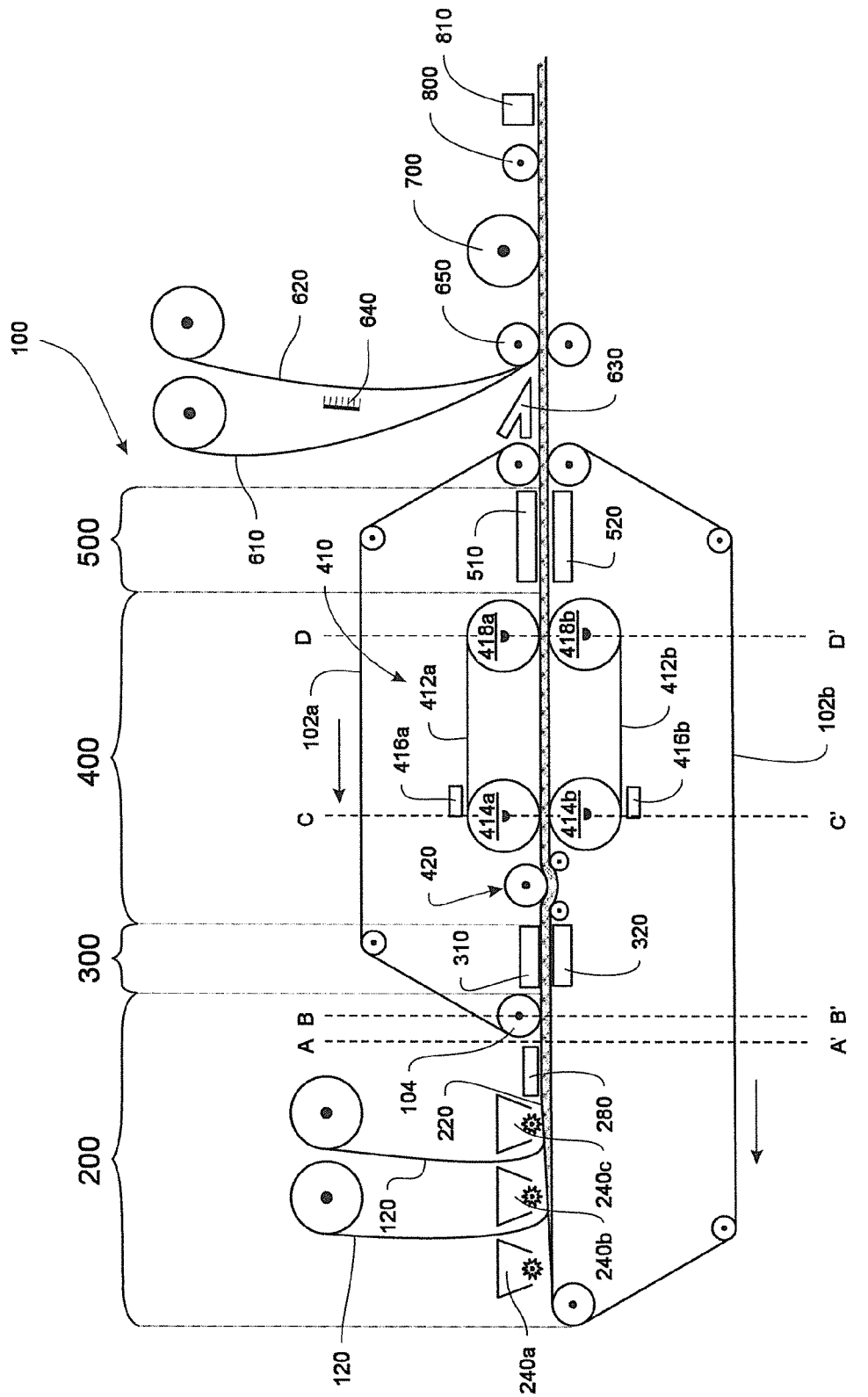
FIG. 2 is an alternative schematic representation of a production process according to the invention.

In an alternative embodiment of the method, as can be seen in FIG. 2, after the heating zone 300 the layers are first compressed by an S-roll 420, before it is supplied to the steel belt press 410.

Figure 3:
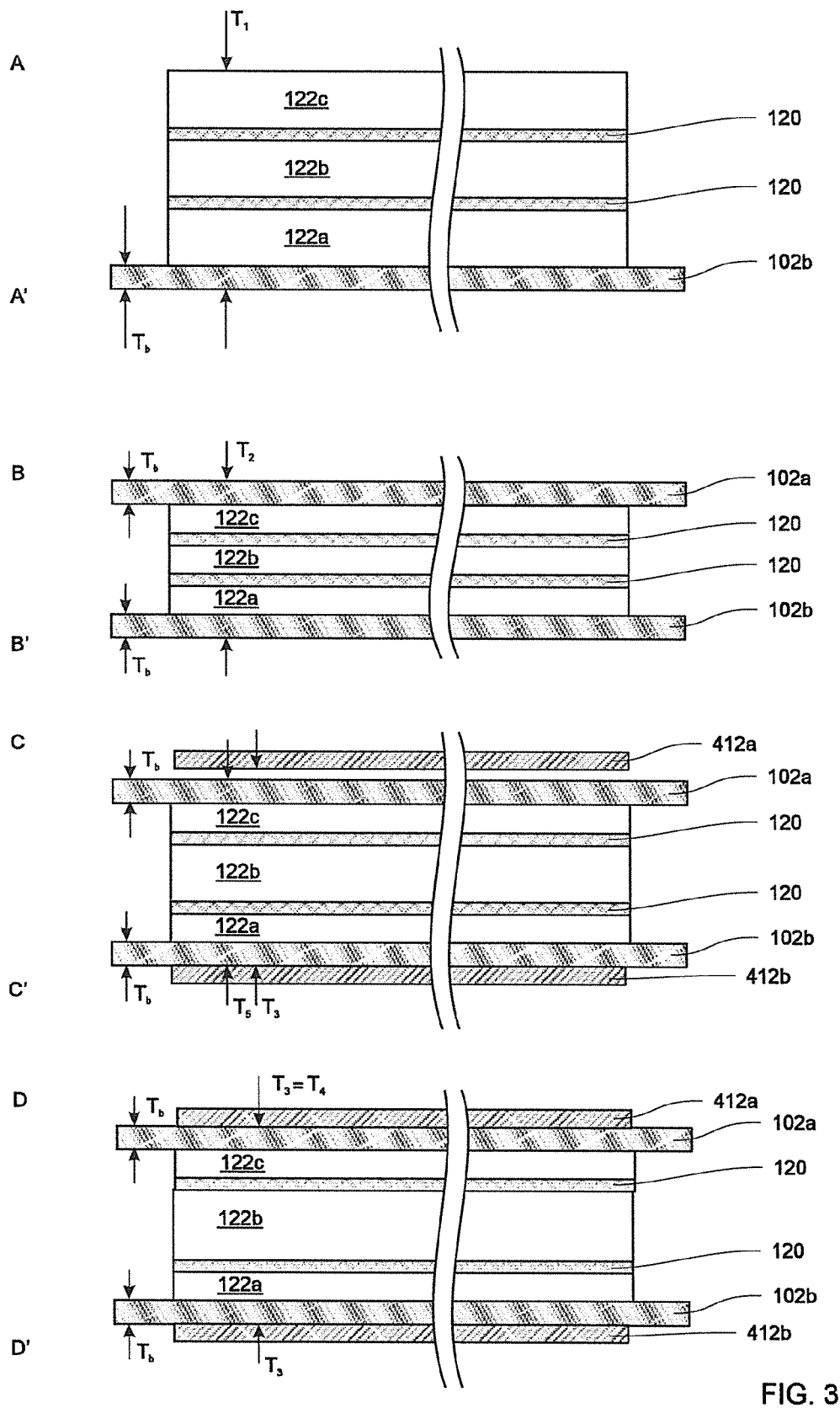
FIG. 3 shows schematic representations of cross sections of the layered structure and substrate at different positions through the production process.

Cross sections of the layered structure and substrate at different positions through the production process are shown in FIG. 3. Section AA' shows the layered structure after the last layer of polymer powder has been spread. The layer of powder 122a is spread by spreading device 240a. The foamable layer of powder 122b is spread by spreading device 240b. The layer of powder 122c is spread by spreading device 240b. Two glass-fiber webs 120 are positioned between the layers of powder. In section AA', the layered structure has a thickness T1. The conveyor belt 102b has a thickness Tb.

On section BB', on the diverting roller 104 of the upper conveyor belt 102a, the opening between the conveyor belts T2 is about half the thickness T1. The layers 122a, 122b and 122c are densified and the air between the granules of the powder is expelled.

After the heating zone 300, at the entrance of the steel belt press at the level of the diverting rollers 414a and 414b (section CC'), it is clear that the foamable layer 122b is already partially foamed, but the opening of the steel belt press (T3) is greater than the sum T5 of the thickness of the layered structure plus the thicknesses of the conveyor belts.

Although cooling takes place in the steel belt press, the foaming of layer 122b will continue. At the outlet of the steel belt press, at the level of the diverting rollers 418a and 418b (section DD'), the opening of the press, which is still T3 in this embodiment, is equal to the sum (T4) of the thickness of the substrate and the thicknesses of the conveyor belts. It should be noted that the increase in thickness of the sum of the thickness of the substrate and the thicknesses of the conveyor belts between the entrance and the outlet of the steel belt press 410 is due to the foaming of the middle layer of 122b.

The thickness of the substrate and the conveyor belts at the level of the reversing rollers, i.e. at the outlet of the steel belt press, is in this embodiment preferably between 1.02 and 1.25 times the thickness of the layered, foaming structure and the thickness of the two conveyor belts at the entrance of the steel belt press, preferably between 1.05 and 1.25 times this thickness.

The layers 122a and 122b are rigid, dense PVC layers with a density of between 1.7 and 2 g/cm$^3$. The layer 122b is a rigid, foamed layer (closed cells) PVC layer with a density of between 0.017 and 0.2 g/cm$^3$.

In another embodiment, rigid, hard PVC is not used for the lower layer 122a, but a more flexible PVC that comprises more than 20 phr of plasticizers.

In an alternative embodiment, micronized powder PVC is not used, but PVC granules, e.g. granules with an essentially cylindrical shape with a diameter between 1 and 3.5 mm, e.g. between 2.8 and 3.2 mm and a height of between 0.5 mm and 1 mm.

It is clear that although the embodiments and/or the materials for the supply of embodiments according to the present invention have been discussed, various changes or modifications may be applied without departing from the scope and/or spirit of the present invention. The present invention is by no means limited to the embodiments described above, but can be implemented according to different variants without departing from the scope of the present invention.

The invention claimed is:

1. A method for making a floor or wall panel comprising a foamed polymer core, said method comprising providing a double belt press comprising two conveyor belts defined by an upper conveyor belt and a lower conveyor belt, the upper and lower conveyor belts being formed from polymeric material, the upper and lower conveyor belts forming a product gap therebetween;

the method further comprising a steel belt press defining a forming zone by an opening formed between an upper steel belt and a lower steel belt;

wherein the upper and lower conveyor belts extend between said upper and lower steel belts with said product gap formed in between;

wherein at least two layers of the polymer powder comprising at least one layer of foamable polymer powder are provided on the lower conveyor belt, wherein said at least one layer of foamable polymer powder is foamed at least partially into a substrate between the upper and lower conveyor belts of the double belt press in the forming zone of the steel belt press, wherein a sum of thicknesses of the two conveyor belts and a total thickness of the layers at an entrance of the steel belt press is less than or equal to the opening of the steel belt press at the entrance of the steel belt press, and wherein the sum of the thicknesses of the upper and lower conveyor belts and the total thickness of the substrate formed at an outlet of the steel belt press is equal to the opening of the steel belt press at the outlet of the steel belt press and is greater than the sum of the thicknesses of the upper and lower conveyor belts and the total thickness of the layers at the entrance of the steel belt press.

2. The method of claim 1, wherein said double belt press comprises the following successive zones:

(i) a spreading zone for spreading the at least one layer of foamable polymer powder on the lower of the two conveyor belts;

(ii) a heating zone for heating the at least one layer of foamable polymer powder;
(iii) said forming zone;
(iv) a cooling zone for cooling the substrate formed;
said method further comprising
heating the layers in the heating zone, then
transforming the at least two layers of polymer powder in the forming zone into a polymer substrate comprising a foamed layer of polymer, and
cooling the foamed polymer substrate in the cooling zone;
wherein the foamable polymer powder foams at least partially in the forming zone, the sum of the thicknesses of the two conveyor belts and the total thickness of the layers at the entrance of the steel belt press is less than or equal to the opening of the steel belt press at the entrance of the steel belt press, and wherein the sum of the thicknesses of the two conveyor belts and the total thickness of the substrate at the outlet of the steel belt press
is equal to the opening of the steel belt press at the outlet of the steel belt press and
is greater than the sum of the thicknesses of the two conveyor belts and the total thickness of the layers at the entrance of the steel belt press.

3. The method of claim 2, wherein after the cooling zone, a decorative layer and/or a wearing layer are/is applied on the formed substrate.

4. The method of claim 3, wherein a coating is applied on the wearing layer.

5. The method of claim 3, wherein the decorative layer and/or the wearing layer is applied by thermal laminating.

6. The method of claim 2, wherein the foaming of the at least one layer of foamable polymer powder starts in the heating zone.

7. The method of claim 1, wherein the opening of the steel belt press at the entrance of the steel belt press is identical to the opening of the steel belt press at the outlet of the steel belt press.

8. The method of claim 1, wherein the forming zone comprises a pair of press rolls and/or an S-bend roll, which is positioned before the steel belt press.

9. The method of claim 1, wherein the steel belt press is an isochoric steel belt press.

10. The method of claim 1, wherein the steel belt press is an isobaric steel belt press.

11. The method of claim 1, wherein said at least one layer of foamable polymer powder is a layer of foamable PVC powder.

12. The method of claim 1, wherein the at least two layers of polymer powder are one or more layers of PVC powder.

13. The method of claim 1, wherein the at least one layer of foamable polymer powder foams chemically.

14. The method of claim 1, wherein the at least one layer of foamable polymer powder foams by expansion of one or more fillers.

15. The method of claim 1, wherein the foaming of the at least one layer of foamable polymer powder starts or continues in the forming zone.

16. The method of claim 1, wherein during transforming, the steel belt press is used to heat the layers of polymer.

17. The method of claim 1, wherein during transforming, the steel belt press is used to cool the layers of polymer.

18. The method of claim 1, wherein the layer of foamable polymer powder is the first layer of polymer powder that is spread on the lower conveyor belt.

19. The method of claim 1, wherein the layer of foamable polymer powder is the second or further layer of polymer powder that is spread on the lower conveyor belt.

20. The method of claim 19, wherein the layer of foamable polymer powder is the last layer of polymer powder that is spread on the lower conveyor belt.

* * * * *